Aug. 23, 1966  N. P. MILLIGAN ETAL  3,268,768
TEMPERATURE PROTECTION CIRCUIT
Filed June 3, 1963
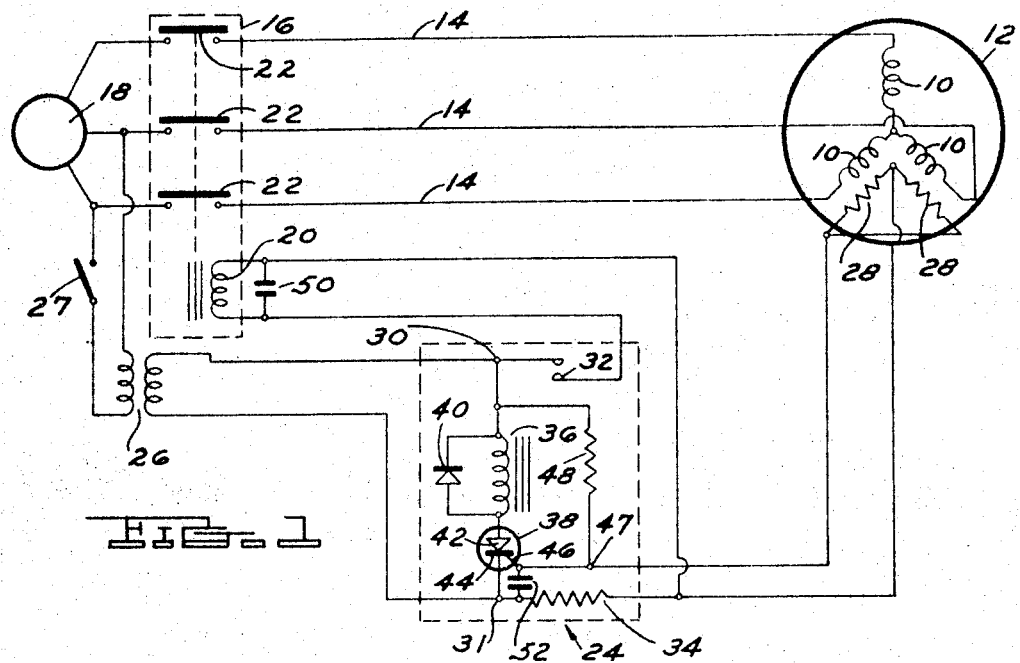
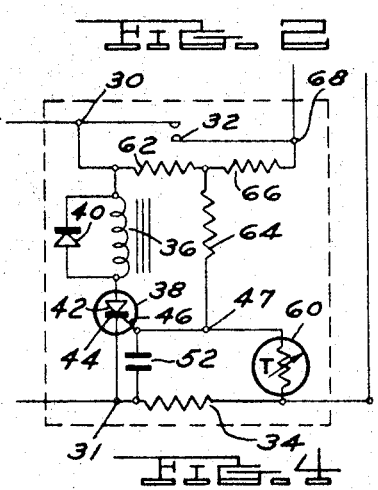
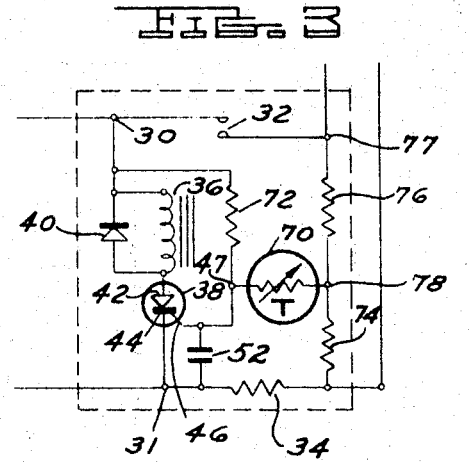
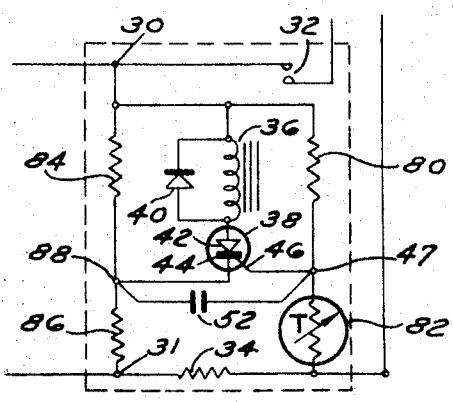
INVENTORS
NEAL P. MILLIGAN
PAUL B. HOVER
BY
Barnes, Kisselle, Raisch & Choate
ATTORNEYS

United States Patent Office 3,268,768
Patented August 23, 1966

3,268,768
TEMPERATURE PROTECTION CIRCUIT
Neal P. Milligan and Paul B. Hover, Columbus, Ohio, assignors to Tecumseh Products Company, Tecumseh, Mich., a corporation of Michigan
Filed June 3, 1963, Ser. No. 284,864
17 Claims. (Cl. 317—13)

This invention relates to a control circuit and in particular to a circuit for protecting motor windings against excessive temperatures.

The objects of this invention are to provide a control circuit, especially suited for use as a protection circuit for motor windings, that is economical, versatile and dependable; that acts rapidly and positively in response to temperature variations which closely follow the actual temperature of the winding; and that provides a temperature lag after the motor has been disconnected due to excessive winding temperatures so that the motor will cool to a temperature at which it can be restarted effectively.

In the drawings:

FIG. 1 is a circuit diagram of a simplified control circuit having current feedback from a main contactor to a silicon controlled rectifier for protecting a three-phase motor against excessive motor winding temperatures.

FIGS. 2 and 3 illustrate modifications of the circuit shown in FIG. 1 where voltage and current feedback are combined to protect against excessive motor winding temperatures.

FIG. 4 illustrates a further modification of the circuit shown in FIG. 1 where the rectifier has an additional bias circuit to compensate for variations in the rectifier firing point.

By way of description and not for purposes of limitation, in FIG. 1 a plurality of windings 10 in a three-phase motor 12 are connected through three lines 14 and a main contactor 16 to a three-phase source 18. Contactor 16 has a solenoid 20 for actuating a plurality of normally open contacts 22 each of which is connected in a respective line 14. A protection circuit, indicated generally by numeral 24 and enclosed by a broken line, is coupled to one phase of source 18 by a step-down transformer 26 and an on-off switch 27. Protection circuit 24 energizes solenoid 20 in response to variations in the temperature of windings 10 sensed by a pair of paralleled thermistors 28. Solenoid 20 is connected across transformer 26 by a series branch circuit comprising a pair of input terminals 30, 31, a pair of normally open relay contacts 32, solenoid 20 and a current feedback resistor 34. Contacts 32 are opened and closed by a relay coil 36 connected in series with a silicon controlled rectifier 38 across terminals 30, 31. A diode 40 is connected directly in parallel with coil 36 to eliminate relay chatter. Rectifier 38 has an anode 42 connected directly to coil 36, a cathode 44 connected directly to terminal 31, and a control electrode 46 connected directly to a junction 47 between a bias resistor 48 and thermistors 28. Resistor 48 and the parallel thermistors 28 are serially connected with resistor 34 across terminals 30, 31.

Each thermistor 28 is of the type commercially known as a "bead" thermistor which has a small thermal mass and is capable of following the temperature of windings 10 to within about five degrees. Preferably, each of the thermistors 28 is embedded in a respective winding 10 to assure thermal communication. Each thermistor 28 has a negative temperature coefficient of resistance so that resistance decreases as the temperature of windings 10 increases. A capacitor 50 is connected across solenoid 20 to reduce contact arcing and transient voltages which are developed when the contacts 32 are opened. A capacitor 52 is connected between electrode 46 and terminal 31 to filter transient voltages.

With the above described circuit, motor 12 is started by closing switch 27. If the temperature of windings 10 is not excessive, the resistance of thermistors 28 is high enough so that when current flows through the branch circuit including resistor 48, thermistors 28, and resistor 34, the bias voltage at junction 47 is sufficient to fire rectifier 38. Rectifier 38 conducts during positive half cycles of the source 18, to energize coil 36 and close contacts 32. Although rectifier 38 may conduct for only about one-fourth of a cycle, contacts 32 are maintained closed due to the conventional holding function of diode 40. As soon as contacts 32 close, current flows through a branch circuit from terminal 30 through contacts 32, solenoid 20 and resistor 34 to terminal 31. Contactor 16 is pulled in, closing contacts 22 to energize windings 10. Current flow through resistor 34 provides positive current feedback to increase the bias voltage at junction 47 and electrode 46. So long as the temperature of windings 10 is not excessive, the bias voltage across junction 47 and terminal 31 is sufficient to fire rectifier 38. However, if the temperature of windings 10 increases to a predetermined excessive or turn-off temperature, the resistance of thermistors 28 decreases to a value such that the voltage at junction 47, including the feedback from resistor 34, is insufficient to fire rectifier 38. Therefore, if the temperature of windings 10 reaches the turn-off temperature, rectifier 38 will stop conducting, contacts 32 open, solenoid 20 is disconnected from source 18, and contacts 22 are opened to disconnect windings 10 from source 18. As the windings 10 cool and the temperature decreases or recedes from the turn-off temperature, the resistance of thermistors 28 increases to increase the bias voltage at junction 47 and electrode 46. When the temperature of windings 10 recedes to a lower limit or turn-on temperature, determined primarily by the values of resistor 48 and thermistor 28, the bias voltage at junction 47 is again sufficient to fire rectifier 38 so that windings 10 are energized.

With the above described circuit a temperature lag or temperature differential between turn-on and turn-off temperatures is achieved by current feedback from resistor 34. Since the voltage on electrode 46 necessary to fire rectifier 38 is fixed, the bias voltage at junction 47 at the turn-on temperature must equal the bias voltage at the turn-off temperature. The resistance of resistor 48 and thermistors 28 is large relative to the resistance of resistor 34 so that when contacts 32 are open the voltage at junction 47 depends primarily on the value of resistor 48 and thermistors 28. However, when contacts 32 are closed the voltage at junction 47 is the voltage across resistor 34 caused primarily by solenoid current, combined with the voltage across thermistors 28. Therefore, the turn-on temperature can be changed by varying the value of resistor 48. Within certain limitation the value of resistor 48 will not materially affect the temperature lag which depends primarily on the voltage across resistor 34 when current flows through solenoid 20. Similarly, the temperature difference can be changed by varying the value of resistor 34. Within certain limitations the value of resistor 34 will not materially affect the turn-on temperature which depends primarily on the value of resistor 48 and thermistors 28.

In the protection circuit illustrated in FIG. 2 the connections external to the broken line are identical to those shown in FIG. 1. For convenience thermistors 28 of FIG. 1 are illustrated as a single thermistor 60 within the broken line. In FIG. 2 components which function substantially the same as components illustrated in FIG. 1 are indicated by like reference numerals. In FIG. 2, when contacts 32 are open the bias for electrode 46 is taken from a branch circuit comprising terminal 30, a resistor 62, a resistor 64, thermistor 60, resistor 34 and terminal 31. The series resistance of resistors 62, 64 and thermistor 60 is made large relative to resistor 34, so that resistor 34 has little effect upon the turn-on temperature. A resistor 66 is connected between the junction of resistors 62, 64 and a relay terminal 68. Resistor 66 is large enough so that when contacts 32 are open, the current through solenoid 20 is insufficient to pull in contacts 22.

With the protection circuit described in conjunction with FIG. 2, when switch 27 is closed and if the temperature of windings 10 is not excessive, the resistance of thermistor 60 is high enough so that the voltage at junction 47 is sufficient to fire rectifier 38. Rectifier 38 fires to close contacts 32, energize solenoid 20, close contacts 22, and energize windings 10. As soon as contacts 32 close current through the branch circuit including solenoid 20 and resistor 34 provides positive feedback to electrode 46 in a manner similar to that disclosed in conjunction with FIG. 1. Additionally, when contacts 32 close resistors 62 and 66 are connected in parallel to provide a voltage feedback to junction 47 and electrode 46 in addition to the current feedback from resistor 34. By comparison with FIG. 1, if the series impedance of resistors 62, 64 equals the resistance of resistor 48 in FIG. 1, when contacts 32 are open the voltage at junction 47 in FIG. 2 will be substantially equal to the voltage at junction 47 in FIG. 1. However, when contacts 32 are closed, the combined resistance of resistors 62, 66, together with resistor 64 will be less than resistor 48 in FIG. 1 so that the voltage at junction 47 in FIG. 2 is greater than in FIG. 1. If the temperature of windings 10 reaches a predetermined turn-off temperature, the resistance of thermistor 60 decreases to a value such that the voltage at junction 47 is insufficient to fire rectifier 38. Rectifier 38 stops conducting to open contacts 32, de-energize solenoid 20, open contacts 22, and de-energize windings 10. With contacts 32 open, the windings 10 must cool to a turn-on temperature where the corresponding resistance of thermistor 60 is such that the voltage at junction 47 is again sufficient to fire rectifier 38. Since the voltage on electrode 46 necessary to fire rectifier 38 is fixed, the bias voltage at junction 47 corresponding to the turn-on temperature must equal the bias voltage at junction 47 corresponding to the turn-off temperature. The combined resistance of resistors 62, 64 and thermistor 60 is large relative to the resistance of resistor 34 so that when contacts 32 are open the voltage at junction 47 depends primarily on the value of resistors 62, 64 and thermistor 60. However, when contacts 32 are closed the voltage at junction 47 also includes the voltage across resistor 34 caused primarily by solenoid current, combined with the voltage feedback caused by paralleling resistors 62, 66. Since the temperature difference produced by the voltage and current feedback depend primarily on the value of resistor 66 and resistor 34, respectively, whereas the turn-on temperature depends primarily on the values of resistors 62, 64 and thermistor 60, either the turn-on temperature or the temperature difference can be changed substantially independent of the other.

In the protection circuit illustrated in FIG. 3 the connections external to the broken line are identical to those in FIG. 1. As with FIG. 2 thermistors 28 of FIG. 1 are illustrated as a single thermistor 70 within the broken line for purposes of convenience. In FIG. 3 components which function substantially the same as components illustrated in FIGS. 1 and 2 are indicated by like reference numerals. In FIG. 3, when contacts 32 are open the bias for electrode 46 is taken from a branch circuit comprising terminal 30, a resistor 72, thermistor 70, a resistor 74, resistor 34 and terminal 31. The series resistance of resistor 72 and thermistor 70 is large relative to the series resistance of resistors 34, 74 so that when contacts 32 are open the voltage at junction 47 depends primarily on the value of resistor 72 and thermistor 70. A resistor 76 is connected between a relay terminal 77 and a terminal 78 at the junction of thermistor 70 and resistor 74. Resistor 76 may be about one-tenth the value of resistor 72 and thermistor 70 but is large enough so that when contacts 32 are open, the current through solenoid 20 is insufficient to pull in contacts 22.

The operation of the protection circuit described in conjunction with FIG. 3 is substantially similar to the operation of the circuit shown in FIG. 2 except that when contacts 32 close, resistor 76 is paralleled with the series combination of resistor 72 and thermistor 70 to increase the voltage at terminal 78 and junction 47, providing voltage feedback to electrode 46 in addition to the current feedback from resistor 34 caused primarily by solenoid current. Since the temperature difference established by voltage and current feedback depends primarily on the value of resistor 76 and resistor 34, respectively, whereas the turn-on temperature depends primarily on the values of resistors 72, 74 and thermistor 70, either the turn-on temperature or the temperature difference can be changed substantially independent of the other.

In the protection circuit illustrated in FIG. 4 the external connections are the same as in FIGS. 1–3 and like components are indicated by like reference numerals. As with the circuit disclosed in conjunction with FIG. 1, only current feedback from resistor 34 is relied on to provide a difference between turn-on and turn-off temperatures. In FIG. 4, when contacts 32 are open the bias for electrode 46 is taken from a branch circuit comprising terminal 30, a resistor 80, a thermistor 82, resistor 34 and terminal 31. The series resistance of resistor 80 and thermistor 82 is large relative to resistor 34, so that resistor 34 has little effect upon the turn-on temperature. A voltage divider comprising resistors 84 and 86 is connected directly across terminals 30, 31. Cathode 44 is directly connected to a junction 88 between resistors 84 and 86. The addition of resistors 84 and 86 changes the sensitivity of the bias circuit for firing rectifier 38, so that the voltage across junction 47 and terminal 31 necessary to fire rectifier 38 is increased by an amount equal to the drop across resistor 86. By comparison with FIG. 1, the use of resistors 84, 86 makes the relay trip point less dependent on variations in the characteristics of rectifier 38, as for example variations due to age, and also increases the temperature accuracy.

Each of the circuits shown in FIGS. 1–4 has a current feedback resistor 34 to provide positive feedback as a function of current through solenoid 20. In FIGS. 2 and 3 positive voltage feedback is used together with the current feedback. Either current or voltage feedback or both can provide a temperature difference between turn-on and turn-off temperatures. This temperature difference assures effective restarting since a slight temperature rise caused by starting currents will not trip the circuit. However, the current feedback by way of resistor 34 depends upon the solenoid current rating and will vary as the solenoid characteristics vary. Additionally, the voltage feedback by way of resistors 62, 64, 66 in FIG. 2 and resistors 72, 74, 76 in FIG. 3 may not be effective while initial surge current flows in the solenoid. For example, the operating current of solenoid 20 may be 0.5 to 1.0 amperes but the pull-in or initial surge current may be as high as 5 to 10 amperes. These surge currents load the supply at transformer 26 to such an extent that the voltage drops immediately after the contacts 32 close to cancel the effect of any voltage feedback. By using current feedback which is proportional to the surge current combined with voltage feedback, firing of rectifier 38 is assured. Where the contactor has little or no surge currents, such as a heater-bimetal strip contact, voltage feedback alone may be satisfactory. For fixed solenoid characteristics, current feedback alone may be satisfactory. Therefore, depending on the particular application involved, either voltage feedback or current feedback or both may be used. In place of the resistance feedback shown in FIGS. 1–4, either current or voltage feedback or both may be obtained by using additional windings on the relay so that the relay acts as a transformer, or by the use of separate transformers.

In general, with each of the circuits shown in FIGS. 1–4 by properly choosing the magnitude of the feedback resistors relative to bias resistors when the contacts 32 are open, the turn-on temperature can be varied without materially affecting the temperature differential, and the temperature differential can be changed by varying the feedback resistors without materially affecting the turn-on temperature. The circuits shown in FIGS. 1–4 are therefore extremely versatile and may be modified easily for use with various motors operating under different temperature conditions and with different contactors.

When a bead-type thermistor is used in each of the control circuits shown in FIGS. 1–4, extremely effective control is achieved. The bead-type thermistor has physical dimensions small enough so that it can be embedded directly within the winding and a thermal mass small enough so that the temperature of the thermistor will accurately follow the winding temperature to within five degrees. This response is fast enough to protect the winding against rapid heating caused by locked rotor conditions and therefore eliminates the need for a current responsive relay in addition to a temperature sensing device of the type which does not act fast enough to respond to heating caused by locked rotor currents. By way of example and not for purposes of limitation each of the thermistors 28 may be of the type sold commercially by the Victory Engineering Corporation and identified as 35A1. With a five horsepower, three phase, 230 volt motor, with locked rotor from a warm start, a turn-on temperature of 200 degrees F. and a turn-off temperature of 245 degrees F. was obtained with the circuit of FIG. 2 having the following circuit values:

| | |
|---|---|
| Input at terminals 30, 31 | 24 volts A.C. |
| Relay (coil 36, contacts 32) | SIGMA 11 FZ 550 ACS. |
| Rectifier 40 | 1N536. |
| Rectifier 38 | 2N2324. |
| Contactor 16 | RBM 109610. |
| Capacitor 50 | 0.1 µf. |
| Capacitor 52 | 0.5 µf. |
| Resistor 62 | 1,500 ohms. |
| Resistor 64 | 18,000 ohms. |
| Resistor 34 | 0.1 ohm. |
| Resistor 66 | 1,500 ohms. |
| Thermistor 60 | 5,000 ohms at 77 degrees F., 260 ohms at 250 degrees F. (two VECO 35A1 in parallel). |

By way of further example, with a three horsepower, single phase, 230 volt motor, with locked rotor from a warm start, a turn-on temperature of 180 degrees F. and a turn-off temperature of 200 degrees F. was obtained with the circuit of FIG. 4 having the following circuit values:

| | |
|---|---|
| Input at terminals 30, 31 | 24 volts A.C. |
| Relay (coil 36, contacts 32) | SIGMA 11 FZ 550 ACS. |
| Rectifier 40 | 1N536. |
| Rectifier 38 | 2N2324. |
| Contactor 16 | RBM 109610. |
| Capacitor 50 | 0.1 µf. |
| Capacitor 52 | 0.5 µf. |
| Resistor 34 | 0.39 ohm. |
| Resistor 80 | 12,000 ohms. |
| Resistor 84 | 1,200 ohms. |
| Resistor 86 | 18 ohms. |
| Thermistor 82 | 5,000 ohms at 77 degrees F., 260 ohms at 250 degrees F. (two VECO 35A1 in parallel). |

Although the circuits shown in FIGS. 1–4 have been described in conjunction with a temperature protection circuit for a three-phase motor 12, the control achieved by differential operation of each of the circuits may be used in applications other than temperature protection. Additionally, although the thermistors have been disclosed as a pair of thermistor elements embedded in respective windings and connected in parallel, good protection can be achieved with other configurations as for example a single thermistor embedded in one winding or a single thermistor positioned between the windings of a single phase motor.

We claim:
1. A control circuit for use in energizing and deenergizing a load in response to variations of a condition at said load comprising switch means for connecting and disconnecting said load and a source of electrical energy, a relay having an actuator and a pair of contacts, said contacts being connected in circuit with said switch means for energizing said switch means, an electron control device connected in circuit with said actuator for energizing said actuator, bias means for controlling conduction of said device, said bias means comprising means responsive to variations of said condition such that at a first value of said condition said bias means causes said device to energize said actuator and feedback means, said feedback means being coupled between said switch means and said device such that said feedback means is rendered operative by actuation of said contacts when said actuator is energized by said device, said feedback means being adapted upon being so rendered operative to modify the biasing effect of said bias means such that said condition must reach a second value before said bias means is effective to cause said device to deenergize said actuator, said feedback means being rendered inoperative by actuation of said contacts in response to said actuator being deenergized by said device.

2. The combination set forth in claim 1 wherein said feedback means comprises means for providing current feedback from said switch means to said device when said switch means is energized.

3. The combination set forth in claim 1 wherein said fedback means comprises means for providing voltage feedback from said switch means to said device when said switch means is energized.

4. The combination set forth in claim 3 wherein said feedback means further comprises means for providing current feedback from said switch means to said device when said switch means is energized.

5. The combination set forth in claim 1 wherein said control circuit further comprises a pair of input terminals, said electron control device has a control electrode and a pair of main electrodes, said main electrodes being connected in series with said actuator across said terminals, and said bias means and said feedback means comprise first and second branch circuits respectively, said first branch circuit comprising said terminals, a first resistor said condition responsive means and a second resistor, means connecting said control electrode to said first branch circuit at a point electrically between said terminals, said second branch circuit comprising said contacts, said switch means and said second resistor.

6. The combination set forth in claim 1 wherein said control circuit further comprises a pair of input terminals, said electron control device has a control electrode and a pair of main electrodes, said main electrodes being connected in series with said actuator across said terminals, and said bias means comprises a first branch circuit and said feebback means comprises second and third branch circuits, said first branch circuit comprising said terminals, a first resistor, said condition responsive means and a second resistor, means connecting said control electrode to said first branch circuit at a point electrically between said terminals, said second branch circuit comprising said terminals, said contacts, a third resistor, said condition responsive means and said second resistor, said third branch circuit comprising said terminals, said contacts, said switch means and said second resistor.

7. The combination set forth in claim 1 wherein said control circuit further comprises a pair of input terminals, said electron control device has a control electrode and a pair of main electrodes, said main electrodes being connected in series with said actuator across said terminals, said bias means comprises a first branch circuit and said feedback means comprises second and third branch circuits, said first branch circuit comprising said terminals, a first resistor, said condition responsive means, a second resistor and a third resistor, means connecting said control electrode to said first branch circuit at a point electrically between said terminals, said second branch circuit comprising said terminals, said contacts, a fourth resistor, said second resistor and said third resistor, said third branch circuit comprising said terminals, said contacts, said switch means and said third resistor.

8. The combination set forth in claim 1 wherein said control circuit further comprises a pair of input terminals, said electron control device has a control electrode and a pair of main electrodes, said main electrodes being connected in series with said actuator across said terminals, and said bias means comprises first and second branch circuits and said feedback means comprises a third branch circuit, said first branch circuit comprising said terminals, a first resistor, said condition responsive means, and a second resistor, means connecting said control electrode to said first branch circuit at a point electrically between said terminals, said second branch circuit comprising said terminals, a third resistor, and a fourth resistor, one of said main electrodes being connected to said second branch circuit at a point electrically between said terminals, said third branch circuit comprising said terminals, said contacts, said switch means, and said second resistor.

9. A control circuit for de-energizing a load at one limit of a predetermined range of a condition at said load and for energizing said load when said condition has receded from said one limit to an opposite limit of said predetermined condition range comprising means for sensing said condition of said load, a contactor having a solenoid and a pair of contacts, said contacts being adapted to connect and disconnect said load and a source of electrical energy, means for energizing said solenoid in response to said condition sensing means, said energizing means comprising a pair of input terminals, a rectifier having a control electrode and a pair of main electrodes, a relay having a coil and a pair of contacts, said main electrodes being connected in series with said coil across said terminals, first and second branch circuits connected across said terminals, said first branch circuit comprising said terminals, a first resistor, said condition sensing means and a second resistor, said second branch circuit comprising said terminals, said contacts, said solenoid and said second resistor, said control electrode being connected to said first branch circuit at a point electrically between said first resistor and said condition sensing means, the resistance of said second resistor being substantially less than the combined series resistance of said first resistor and said condition sensing means.

10. In combination a load, switch means for connecting and disconnecting said load and a source of electrical energy and means for opening said switch means at one temperature limit of a predetermined range of temperatures of said load and for closing said switch means when the temperature of said load has receded from said one limit to an opposite limit of said predetermined temperature range, said switch opening and closing means comprising a relay having an actuator and a pair of contacts, said contacts being connected in circuit with said switch means and closed by said actuator for energizing said switch means, an electron control device connected in circuit with said actuator for energizing said actuator, bias means for controlling conduction of said device, said bias means comprising feedback means and means responsive to temperature variations of said load such that when the temperature of said load is at said one temperature limit, said temperature responsive means of said bias means causes said device to de-energize said actuator, said feedback means being coupled between said switch means and said device whereby said contacts are operable to energize said switch means and simultaneously to connect said feedback means to said device to modify the bias developed by said bias means such that the temperature of the load must recede to said opposite temperature limit before said temperature responsive means causes said device to energize said actuator.

11. The combination set forth in claim 10 wherein said feedback means comprises an impedance serially connected with said switch means for providing current feedback to said device when said switch means is energized.

12. The combination set forth in claim 10 wherein said feedback means comprises an impedance connected in parallel with said switch means for providing voltage feedback to said device when said switch means is energized.

13. The combination set forth in claim 12 wherein said feedback means further comprises an impedance serially connected with said switch means for providing current feedback to said device when said switch means is energized.

14. In combination a motor having a winding, a source of electrical energy for energizing said winding, means for de-energizing said winding when the temperature of said winding becomes excessive until after said winding has cooled to a temperature where said motor can be restarted effectively, said winding de-energizing means comprising a contactor, said contactor having a solenoid and a pair of main contacts adapted to be opened and closed by said solenoid, said main contacts being connected in circuit between said source and said winding, a pair of input terminals, a relay having a coil and a pair of relay contacts, said relay contacts being connected in circuit between said input terminals and said solenoid, an electron control device having a control electrode and a pair of main electrodes, said main electrodes being connected in series with said coil across said terminals, bias means for controlling conduction of said device, said bias means comprising first and second branch circuits, said first branch circuit comprising said terminals, a first resistor, a thermistor, and a second resistor, said thermistor being embedded directly in said winding, means connecting said control electrode to said first branch circuit at a point electrically between said first resistor and said thermistor, said second branch circuit comprising said terminals, said relay contacts, said solenoid, and said second resistor, said thermistor upon cooling of said winding to said restarting temperature with said contacts open causing conduction of said device to close said relay contacts which thereupon connect said solenoid in series with said second resistor and in parallel with said first resistor and said thermistor to increase the bias at said point so that the temperature of said winding must reach said excessive temperature before said thermistor stops conduction of said device.

15. The combination set forth in claim 14 wherein said bias means further comprises third and fourth branch circuits, said third branch circuit comprising said terminals, said first resistor, a third resistor, said solenoid and said second resistor, said fourth branch circuit comprising said terminals, said relay contacts, said third resistor, said thermistor and said second resistor.

16. The combination set forth in claim 14 wherein said first branch circuit further comprises a third resistor, and said bias means further comprises third and fourth branch circuits, said third branch circuit comprising said terminals, said first resistor, said thermistor, a fourth resistor, said solenoid and said second resistor, said fourth branch circuit comprising said terminals, said relay contacts, said fourth resistor, said third resistor, and said second resistor.

17. The combination set forth in claim 14 wherein said bias means further comprises a third branch circuit comprising said terminals, a third resistor and a fourth resistor, one of said main electrodes being connected to said third branch circuit at a point electrically between the third and fourth resistors.

References Cited by the Examiner

UNITED STATES PATENTS

| | | | |
|---|---|---|---|
| 2,611,808 | 9/1952 | Lawrence | 317—152 |
| 2,787,742 | 4/1957 | Fransen | 317—152 |
| 3,032,690 | 5/1962 | Elliott | 317—13 |
| 3,071,718 | 1/1963 | Gordon | 318—473 |
| 3,225,280 | 12/1965 | Happe et al. | 317—13 |

MILTON O. HIRSHFIELD, *Primary Examiner.*

SAMUEL BERNSTEIN, *Examiner.*

R. V. LUPO, *Assistant Examiner.*